(12) United States Patent
Choi et al.

(10) Patent No.: US 9,992,498 B2
(45) Date of Patent: Jun. 5, 2018

(54) METHOD AND DEVICE FOR GENERATING PARAMETER SET FOR IMAGE ENCODING/DECODING

(71) Applicant: SAMSUNG ELECTRONICS CO., LTD., Suwon-si (KR)

(72) Inventors: Byeong-doo Choi, Suwon-si (KR); Min-woo Park, Hwaseong-si (KR); Yong-jin Cho, Seoul (KR); Jeong-hoon Park, Seoul (KR); Jae-won Yoon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 337 days.

(21) Appl. No.: 14/759,586

(22) PCT Filed: Jan. 7, 2014

(86) PCT No.: PCT/KR2014/000161
§ 371 (c)(1),
(2) Date: Jul. 7, 2015

(87) PCT Pub. No.: WO2014/107098
PCT Pub. Date: Jul. 10, 2014

(65) Prior Publication Data
US 2015/0365676 A1    Dec. 17, 2015

Related U.S. Application Data

(60) Provisional application No. 61/749,467, filed on Jan. 7, 2013.

(51) Int. Cl.
H04N 19/134     (2014.01)
H04N 19/196     (2014.01)
(Continued)

(52) U.S. Cl.
CPC ......... *H04N 19/134* (2014.11); *H04N 19/197* (2014.11); *H04N 19/30* (2014.11);
(Continued)

(58) Field of Classification Search
CPC .... H04N 19/134; H04N 19/197; H04N 19/30; H04N 19/70; H04N 21/235;
(Continued)

(56) References Cited

U.S. PATENT DOCUMENTS

| 7,792,415 B2 | 9/2010 | Toma et al. | |
| 2005/0147375 A1* | 7/2005 | Kadono | H04N 5/783 386/241 |

(Continued)

FOREIGN PATENT DOCUMENTS

| JP | 2004-242286 A | 8/2004 |
| KR | 10-2010-0033447 A | 3/2010 |

(Continued)

OTHER PUBLICATIONS

Search Report dated Mar. 25, 2014 by the International Searching Authority in related application No. PCT/KR2014/000161, (PCT/ISA/210).

(Continued)

*Primary Examiner* — Md Haque
(74) *Attorney, Agent, or Firm* — Sughrue Mion, PLLC

(57) ABSTRACT

A method of generating a parameter set includes obtaining common information inserted into at least two lower parameter sets which belong to the same upper parameter set; determining whether the common information is to be added to at least one among the upper parameter set and the at least two lower parameter sets; and adding the common information to at least one among the upper parameter set and the at least two lower parameter sets, based on a result of the determining.

16 Claims, 10 Drawing Sheets

(51) Int. Cl.
  *H04N 21/235*  (2011.01)
  *H04N 21/435*  (2011.01)
  *H04N 19/70*   (2014.01)
  *H04N 19/30*   (2014.01)
  *H04N 19/46*   (2014.01)
  *H04N 19/172*  (2014.01)
  *H04N 19/179*  (2014.01)

(52) U.S. Cl.
  CPC .............. *H04N 19/46* (2014.11); *H04N 19/70* (2014.11); *H04N 21/235* (2013.01); *H04N 21/435* (2013.01); *H04N 19/172* (2014.11); *H04N 19/179* (2014.11)

(58) Field of Classification Search
  CPC .. H04N 21/435; H04N 19/172; H04N 19/179; H04N 19/46
  See application file for complete search history.

(56) References Cited

U.S. PATENT DOCUMENTS

2010/0021143 A1*  1/2010  Toma .................. H04N 5/7605
                                                        386/329
2012/0106652 A1   5/2012  Huang et al.

FOREIGN PATENT DOCUMENTS

| WO | 2012091640 A1 | 7/2012 |
| WO | 2012/109990 A1 | 8/2012 |

OTHER PUBLICATIONS

Written Opinion dated Mar. 25, 2014 by the International Searching Authority in related Application No. PCT/KR2014/000161, (PCT/ISA/237).

* cited by examiner

FIG. 12

| | |
|---|---|
| vps_extension( ) { | ← 1210 |
| ⋮ | |
| vps_sps_common_syntax_present_flag | ← 1220 |
| if(!vps_sps_common_syntax_present_flag) | ← 1221 |
| vps_sps_interlayer_prediction_enable_flag | ← 1230 |
| for( i = 1; i<= vps_max_layers_minus1; i++ ) { | |
|   // layer dependency | |
|   num_direct_ref_layers[ i ] | |
|   for( j = 0; j <num_direct_ref_layers[ i ]; j++ ) | |
|     ref_layer_id[ i ][ j ] | |
|   if(vps_sps_interlayer_prediction_enable_flag) { | ← 1231 |
|     interlayer_sps_prediction_flag[ i ] | ← 1232 |
|     if(interlayer_sps_prediction_flag[ i ]) | ← 1233 |
|       sps_prediction_ref_layer_id[ i ] | ← 1234 |
|   } | |
| } | |
| ⋮ | |
| If(vps_sps_common_syntax_present_flag) { | ← 1240 |
| vps_restricted_ref_pic_lists_flag | ← 1241 |
| if( vps_restricted_ref_pic_lists_flag ) | ← 1242 |
|   vps_lists_modification_present_flag | ⎫ |
|   vps_log2_min_luma_coding_block_size_minus3 | ⎬ 1243 |
|   vps_log2_diff_max_min_luma_coding_block_size | ⎪ |
|   vps_log2_min_transform_block_size_minus2 | ⎪ |
|   vps_log2_diff_max_min_transform_block_size | ⎭ |
|   ... | |
| } | |
| } | |

FIG. 13

| |
|---|
| seq_parameter_set_rbsp( ) {      ← 1310 |
|   video_parameter_set_id |
|   sps_max_sub_layers_minus1 |
|   sps_reserved_zero_bit |
|   If(!vps_sps_common_syntax_present_flag \|\| layer_id == 0 \|\| interlayer_sps_prediction_flag[ i ]==0 ) {    ← 1320 |
|     restricted_ref_pic_lists_flag |
|     if( restricted_ref_pic_lists_flag ) |
|       lists_modification_present_flag |
|     log2_min_luma_coding_block_size_minus3 |
|     log2_diff_max_min_luma_coding_block_size |
|     log2_min_transform_block_size_minus2 |
|     log2_diff_max_min_transform_block_size |
|     if( pcm_enabled_flag ) { |
|       log2_min_pcm_luma_coding_block_size_minus3 |
|       log2_diff_max_min_pcm_luma_coding_block_size |
|     } |
|     max_transform_hierarchy_depth_inter    ← 1330 |
|     max_transform_hierarchy_depth_intra |
|     scaling_list_enable_flag |
|     if( scaling_list_enable_flag ) { |
|       sps_scaling_list_data_present_flag |
|       if( sps_scaling_list_data_present_flag ) |
|         scaling_list_data( ) |
|     } |
|     amp_enabled_flag |
|     .... |
|   } |
| } |

FIG. 14

| |
|---|
| video_parameter_set_rbsp( ) { — 1410 |
|   video_parameter_set_id |
|   vps_reserved_three_2bits |
|   vps_reserved_zero_6bits |
|   vps_max_sub_layers_minus1 |
|   vps_temporal_id_nesting_flag |
|   vps_reserved_0xffff_16bits |
|   profile_tier_level( 1, vps_max_sub_layers_minus1 ) |
|   bit_rate_pic_rate_info( 0, vps_max_sub_layers_minus1 ) |
|   vps_chroma_format_idc |
|   vps_pic_width_in_luma_samples |
|   vps_pic_height_in_luma_samples |
|   vps_bit_depth_luma_minus8 |
|   vps_bit_depth_chroma_minus8 |
|   vps_frame_packed_flag |
|   vps_interlaced_flag |
|   vps_sub_layer_ordering_info_present_flag |
|   for( i = ( vps_sub_layer_ordering_info_present_flag ? <br>     vps_max_sub_layers_minus1 : 0 ); <br>     i <= vps_max_sub_layers_minus1; i++ ) { |
|     vps_max_dec_pic_buffering[ i ] |
|     vps_max_num_reorder_pics[ i ] |
|     vps_max_latency_increase[ i ] |
|   } |
|   vps_num_hrd_parameters |
|   for( opIdx = 0; opIdx < vps_num_hrd_parameters; opIdx++ ) { |
|     if( opIdx > 0 ) |
|       operation_point_layer_id_flags( opIdx ) |
|     hrd_parameters( opIdx = = 0, vps_max_sub_layers_minus1 ) |
|   } |
|   vps_extension_flag |
|   if( vps_extension_flag ) |
|     while( more_rbsp_data( ) ) |
|       vps_extension_data_flag |
|   } |
|   rbsp_trailing_bits( ) |
| } |

The block from vps_chroma_format_idc through vps_interlaced_flag is labeled 1420.

METHOD AND DEVICE FOR GENERATING PARAMETER SET FOR IMAGE ENCODING/DECODING

RELATED APPLICATIONS

This application is a National Stage Entry of PCT International Application No. PCT/KR2014/000161, filed on Jan. 7, 2014, which claims the benefit of U.S. Provisional Application No. 61/749,467, filed on Jan. 7, 2013, in the US Patent Office, and the disclosures of which are incorporated herein by reference in their entireties.

BACKGROUND

1. Field

Methods and apparatuses consistent with exemplary embodiments relate to generating a parameter set to encode/decode an image.

2. Description of Related Art

Recently, as digital display technology has advanced and the high-quality digital TV age has come, new codec has been suggested to process a large amount of video data.

According to the High Efficiency Video Coding (HEVC) standards, a network abstraction layer (NAL) unit of encoded image data may include parameter sets corresponding to header information. The parameter sets may include a video parameter set (VPS), a sequence parameter set (SPS), a picture parameter set (PPS), etc.

Thus, much attention has been paid to methods of generating a parameter set and encoding or decoding an image in order to efficiently encode an image.

SUMMARY

Exemplary embodiments include a method and an apparatus for generating a parameter set to efficiently encode or decode image data.

Additional aspects will be set forth in part in the description which follows and, in part, will be apparent from the description, or may be learned by practice of exemplary embodiments.

Exemplary embodiments may address at least the above problems and/or disadvantages and other disadvantages not described above. Also, exemplary embodiments are not required to overcome the disadvantages described above, and an exemplary embodiment may not overcome any of the problems described above.

According to an aspect of one or more exemplary embodiments, a method of generating a parameter set includes obtaining common information inserted into at least two lower parameter sets which belongs to the same upper parameter set; determining whether the common information is to be added to at least one among the upper parameter set and the at least two lower parameter sets; and adding the common information to at least one among the upper parameter set and the at least two lower parameter sets, based on a result of the determining.

The adding of the common information may include generating a first flag indicating that the common information is to be added to the upper parameter set or a second flag indicating that the common information is to be added to at least one among the at least two lower parameter sets, based on the result of the determining; and adding the generated flag to the upper parameter set.

The adding the common information to at least one among the upper parameter set and the at least two lower parameter sets may include adding information, to at least one lower parameter set, which references the common information included in at least one among the upper parameter set and the at least two lower parameter sets, based on the result of the determining.

The common information may include at least one among image format information, bit depth information, resolution information, and three-dimensional (3D) coding information of image data to be encoded. The upper parameter set may be a video parameter set (VPS). The at least two lower parameter sets may be sequence parameter sets (SPSs). The SPSs may be parameter sets referring to the VPS.

According to yet another aspect of one or more exemplary embodiments, a method of decoding an image includes determining whether common information of a lower parameter set is added to at least one among an upper parameter set and at least one lower parameter set; obtaining the common information of the lower parameter set by referring to at least one among the upper parameter set and the at least one lower parameter set, based on a result of the determining; and decoding an image corresponding to the at least one lower parameter set based on the obtained common information.

The determining of whether the common information of the lower parameter set is added to at least one among the upper parameter set and the at least one lower parameter set may include obtaining at least one among a first flag indicating that the common information is added to the upper parameter set and a second flag indicating that the common information is added to the at least one lower parameter set among the lower parameter sets; and determining whether the common information is added to the upper parameter set or the at least one lower parameter set, based on the at least one of the first and second flags.

The common information may include at least one among image format information, bit depth information; resolution information; and three-dimensional (3D) coding information of image data to be encoded. The upper parameter set may be a video parameter set (VPS). The at least one lower parameter set may be a sequence parameter set (SPS). The SPS may be a parameter set which belongs to the same VPS.

The decoding of the image corresponding to the at least one lower parameter set may include performing session negotiation or selecting data to be decoded, based on at least one among the image format information, the bit depth information, the resolution information, and the 3D coding information of the image data to be encoded; and decoding the image based on a result of the performing session negotiation or the selecting data to be decoded.

According to yet another aspect of one or more exemplary embodiments, a parameter set generation apparatus includes a common information obtainer configured to obtain common information commonly inserted into at least two lower parameter sets which belong to the same upper parameter set; and a parameter set generator which determines whether the common information is to be added to at least one among the upper parameter set and the at least two lower parameter sets, and which adds the common information to at least one among the upper parameter set and the at least two lower parameter sets, based on a result of the determining.

According to an aspect of one or more exemplary embodiments, an image decoding apparatus includes a common information obtainer configured to determine whether common information of a lower parameter set is added to at least one among an upper parameter set and at least one lower parameter set, and configured to obtain the common information of the lower parameter set with reference to at least one among the upper parameter set and the at least one lower parameter set, based on a result of the determining; and an image decoder configured to decode an image corresponding to the at least one lower parameter set based on the obtained common information.

BRIEF DESCRIPTION OF THE DRAWINGS

The above and/or other aspects will become apparent and more readily appreciated from the following detailed description of exemplary embodiments, taken in conjunction with the accompanying drawings in which:

FIGS. 12 to 14 are diagrams illustrating examples of parameters sets including syntax elements according to exemplary embodiments.

DETAILED DESCRIPTION OF EXEMPLARY EMBODIMENTS

Figure 1:
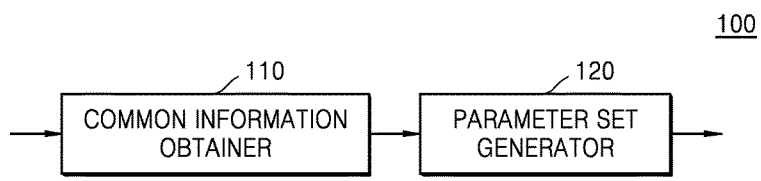
FIG. 1 is a block diagram illustrating an internal structure a parameter set generation apparatus according to an exemplary embodiment.

Hereinafter, exemplary embodiments will be described in detail with reference to the accompanying drawings. In the following disclosure and the accompanying drawings, well-known functions or constructions are not described and illustrated in detail if it is determined that they would obscure the invention due to unnecessary detail. Also, the same elements are denoted by the same reference numerals throughout the drawings, if possible.

The terms or expressions used in the present specification and the claims should not be construed as being limited to as generally understood or as defined in commonly used dictionaries, and should be understood according to a technical field of exemplary embodiments, based on the principle that the inventor(s) of the application can appropriately define the terms or expressions to optimally explain exemplary embodiments. Thus, the exemplary embodiments set forth in the present specification and drawings are just examples and do not completely represent an inventive concept. Accordingly, it would be obvious to those of ordinary skill in the art that the above exemplary embodiments are to cover all modifications, equivalents, and alternatives falling within the scope of an inventive concept at the filing date of the present application.

It will be understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Also, the terms "unit", "module", "component", etc. mean units for processing at least one function or operation and may be embodied as hardware, software, or a combination thereof.

The principle of exemplary embodiment is applicable to coding standards based on any intra-frames/inter-frames. Throughout the present disclosure, the term 'image' has been used as a comprehensive term to cover not only the term 'image' itself but also other various shapes of video image information, such as a 'frame', a 'field', and a 'slice', which are known in the technical field to which exemplary embodiments pertain.

As used herein, expressions such as "at least one of," when preceding a list of elements, modify the entire list of elements and do not modify the individual elements of the list.

Exemplary embodiments will now be described with reference to the accompanying drawings.

FIG. 1 is a block diagram illustrating an internal structure of a parameter set generation apparatus according to an exemplary embodiment;

A parameter set that may be used to encode or decode image data has been suggested to prevent an error from occurring due to damage to a sequence header or a picture header. A sequence parameter set or a picture parameter set may include identification information included in a sequence header or a picture header, common syntax elements, image information, etc. A video parameter set may include syntax elements or image information that may be commonly used for the sequences of image data including a plurality of layers. The information included in each of these parameter sets may be used to encode or decode an image corresponding to each image data.

In an exemplary embodiment, the sequence parameter set will be referred to as 'SPS', the picture parameter set will be referred to as 'PPS', and the video parameter set will be referred to as 'VPS'.

By referring to an upper parameter set of each parameter set, information included in the upper parameter set may be used to encode or decode image data corresponding to each parameter set. For example, a PPS may refer to an SPS corresponding to a sequence to which a picture corresponding to the PPS belongs, and an SPS may refer to a VPS of scalable image data to which a sequence corresponding to the SPS belongs. Thus, information in the upper parameter set may be obtained and used to encode or decode an image corresponding to the PPS or the SPS.

In the following exemplary embodiment, an upper parameter set may be a parameter set that may be referred to by a lower parameter set. For example, a VPS may be an upper parameter set of an SPS, and an SPS may be an upper parameter set of a PPS.

Referring to FIG. 1, the parameter set generation apparatus 100 may include a common information obtainer 110 and a parameter set generator 120, which may be embodied as hardware, software, or a combination thereof. However, all of the elements of the parameter set generation apparatus 100 illustrated in FIG. 1 are not indispensable elements. The parameter set generation apparatus 100 may further include other elements or may include only one of these elements.

These elements according to an exemplary embodiment will be described below.

The common information obtainer 110 may obtain common information commonly inserted into at least two lower parameter sets referring to the same upper parameter set.

In the following description of exemplary embodiments, that information is inserted into a parameter set should be understood as that the information is to be added to the parameter set or that the information is added to the parameter set but may not be encoded in an encoding process. Also, that the information is added to the parameter set should be understood as that the information is added to the parameter set so as to be encoded.

The common information may include information commonly included in two or more parameter sets of the same rank. For example, the common information obtainer 110 may obtain common information commonly inserted into two or more SPSs referring to the same VPS.

According to an exemplary embodiment, the common information may include at least one among image format information, bit depth information, resolution information, and three-dimensional (3D) coding information of image data to be encoded. The information described above may be included in an upper parameter set to be processed earlier than a lower parameter set and may be thus used to perform session negotiation or contents selection (which will be described below) during an image decoding process. The session negotiation or the contents selection will be described in detail when an image decoding apparatus 300 is described below.

The parameter set generator 120 may add the common information obtained by the common information obtainer 110 to an upper parameter set or to at least one lower parameter set among lower parameter sets including the common information. Thus, common information of a lower parameter set may be obtained by referring to an upper parameter set or the at least one upper parameter set to which the common information is added.

Thus, according to an exemplary embodiment, common information that may be redundantly added to at least two lower parameter sets may be added to an upper parameter set or at least one lower parameter set. Accordingly, the common information may be prevented from being redundantly added to two or more lower parameter sets, thereby minimizing the amount of information to be encoded.

The common information of two or more lower parameter sets into which the common information was inserted may be obtained by referring to the upper parameter set or the at least one lower parameter set to which the common information is added during a subsequent decoding process.

Figure 2:
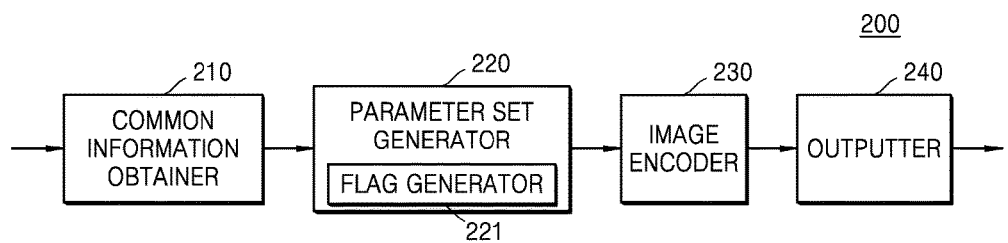
FIG. 2 is a block diagram illustrating an internal structure of an image encoding apparatus according to an exemplary embodiment.

FIG. 2 is a block diagram illustrating an internal structure of an image encoding apparatus according to an exemplary embodiment.

Referring to FIG. 2, the image encoding apparatus 200 may include a common information obtainer 210, a parameter set generator 220, an image encoder 230, and an outputter 240, which may be embodied as hardware, software, or a combination thereof. The common information obtainer 210 and the parameter set generator 220 of FIG. 2 correspond to or are analogous to the common information obtainer 110 and the parameter set generator 120 of FIG. 1, respectively. Thus, descriptions of the common information obtainer 210 and the parameter set generator 220 that are respectively the same as those of the common information obtainer 110 and the parameter set generator 120 are omitted here. The elements of the image encoding apparatus 200 illustrated in FIG. 2 are, however, not indispensable elements. The image encoding apparatus 200 may further include other elements or may include only some of the elements.

These elements will be described below according to an exemplary embodiment.

The common information obtainer 210 may obtain common information commonly inserted into at least two lower parameter sets referring to the same upper parameter set. The common information may include information commonly included in two or more parameter sets of the same rank. For example, the common information obtainer 210 may obtain common information commonly inserted into two or more SPSs or PPSs referring to the same VPS.

The parameter set generator 220 may add the common information obtained by the common information obtainer 210 to an upper parameter set or at least one lower parameter set among lower parameter sets including the common information.

The parameter set generator 220 may include a flag generator 221 to generate a flag indicating whether the common information is included and to add the flag to a parameter set. At least one flag among a flag indicating whether the common information is to be added to the upper parameter set and a flag indicating whether the common information is to be added to the at least one lower parameter set may be added to the upper parameter set or a lower parameter set to which the common information is added.

For example, both the two flags described above may be included in the upper parameter set. Also, the flag indicating whether the common information is to be added to the at least one lower parameter set may be added to the lower parameter sets to which the common information is added.

Furthermore, a parameter set for obtaining common information by referring to another parameter set may include information for referring to the other parameter set.

The image encoder 230 may encode an image, based on common information or a flag added by the parameter set generator 220.

The outputter 240 may output a bitstream containing the image encoded by the image encoder 230 and information needed to decode the image, i.e., a bitstream containing a plurality of parameter sets.

Figure 3:
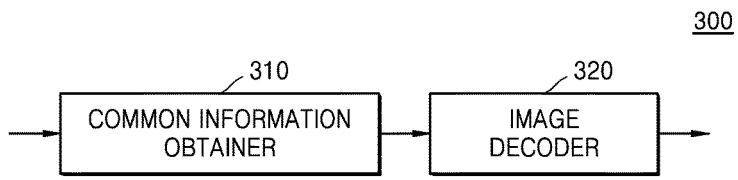
FIGS. 3 and 4 are block diagrams illustrating internal structures of image decoding apparatuses according to exemplary embodiments.
Figure 4:
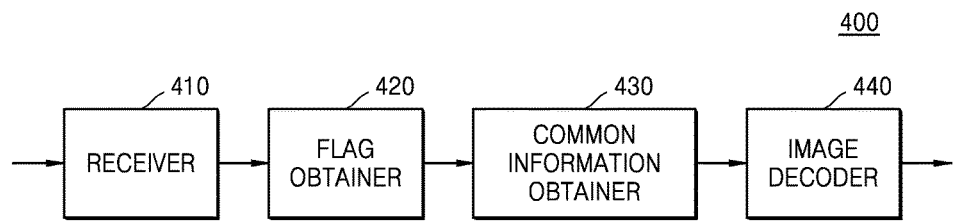

FIG. 3 is a block diagram illustrating an internal structure of an image decoding apparatus 300 according to an exemplary embodiment. FIG. 4 is a block diagram illustrating an internal structure of an image decoding apparatus 400 according to another exemplary embodiment.

Referring to FIG. 3, the image decoding apparatus 300 may include a common information obtainer 310 and an image decoder 320, which may be embodied as hardware, software, or a combination thereof. However, all of these elements are not indispensable elements. The image decoding apparatus 300 may further include other elements or only one of these elements.

These elements will be described below, according to an exemplary embodiment.

The common information obtainer 310 may obtain common information from an upper parameter set or a lower parameter set according to whether common information of at least one lower parameter set is added to the upper parameter set or the lower parameter set.

The image decoder 320 may decode an image based on the common information obtained by the common information obtainer 310.

According to an exemplary embodiment, the common information that may be added to the upper parameter set may include at least one among image format information, bit depth information, resolution information, and 3D coding information of image data to be encoded as described above.

The image format information may contain information regarding an image format of a current image. For example, the image format may be 4:4:4 or 4:2:2.

The bit depth information may include information regarding a bit depth indicating the number of bits that represent color values of pixels of an image.

The resolution information may include information regarding the number of pixels per width or height of the image.

The 3D coding information may include at least one of information indicating whether the current image is frame-packed and information indicating whether the current image has an interlaced video format. Frame packing information may indicate whether left and right images that constitute a 3D image are formatted and encoded in one image format. Interlaced information indicates whether the left and right images are encoded such that the left and right images are interlaced when the frame packing information indicates that the left and right images are formatted in one image format.

The information described above may be included in an upper parameter set, which may be processed earlier than a lower parameter set, to be used for session negotiation or contents selection during an image decoding process.

The session negotiation may include an operation for determining data to be received from an external device beforehand so that data needed for the image decoding apparatus 300 to decode an image or data that may be decoded by the image decoding apparatus 300 may be selectively received. In this case, the external device is a device configured to transmit encoded image data to the image decoding apparatus 300, and may be an image encoding apparatus or an apparatus storing the encoded image data.

For example, the image decoding apparatus 300 may select image data needed for the image decoding apparatus 300 to decode an image and receive the image data from the external device, based on at least one among the image format information, the bit depth information, the resolution information, and the 3D coding information. For example, when the image decoding apparatus 300 cannot reproduce a 3D image, the 3D image or information needed to encode the 3D image may not be needed. Thus, through the session negotiation, the image decoding apparatus 300 may determine not to receive a 3D image or information needed to encode the 3D image but to receive a two-dimensional (2D) image or information needed to encode the 2D image.

Thus, the common information described above according to an exemplary embodiment may be obtained earlier than a bitstream containing encoded image data, thereby enabling the image decoding apparatus 300 to select image data to be received, based on the common information.

Furthermore, the image decoding apparatus 300 may select content based on the common information described above. That is, the image decoding apparatus 300 may select image data needed to decode an image, based on the common information. For example, the image decoding apparatus 300 may select and decode image data for decoding an image, based on at least one among the image format information, the bit depth information, the resolution information, and the 3D coding information.

Accordingly, the common information described above according to an exemplary embodiment may be obtained earlier than a bitstream containing encoded image data, and the image decoding apparatus 300 may thus select image data to be encoded based on the common information before the image data is decoded. Also, the image decoding apparatus 300 may decode image data selected based on the common information.

Referring to FIG. 4, the image decoding apparatus 400 may include a receiver 410, a flag obtainer 420, a common information obtainer 430, and an image decoder 440, which may be embodied as hardware, software, or a combination thereof. The common information obtainer 430 and the image decoder 440 of FIG. 4 correspond or are analogous to the common information obtainer 310 and the image decoder 320 of FIG. 3, respectively. Descriptions of the common information obtainer 430 and the image decoder 440 that are respectively the same as those of the common information obtainer 310 and the image decoder 320 are omitted here. All of the elements of the image decoding apparatus 400 illustrated in FIG. 4 are not indispensable elements. The image decoding apparatus 400 may further include other elements or may include only some of these elements.

The elements of the image decoding apparatus 400 will be described below, according to an exemplary embodiment.

The receiver 410 may receive and parse a bitstream containing an encoded image.

The flag obtainer 420 may receive a flag indicating whether common information is included in at least one of an upper parameter set and a lower parameter set from the parsed bitstream. At least one lower parameter set may receive the common information by referring to the upper parameter set or the lower parameter set, based on the flag. That is, when an image corresponding to the at least one lower parameter set is to be decoded, the image decoding apparatus 400 may obtain common information by referring to the upper parameter set or the lower parameter set containing the common information.

The common information obtainer 430 may receive the common information from the upper parameter set or the lower parameter set, based on the flag obtained by the flag obtainer 420. In this case, the image decoding apparatus 400 may receive the common information from the upper parameter set or the lower parameter set by using reference information contained in a current parameter set.

The image decoder 440 may decode image data corresponding to the current parameter set, based on the common information obtained by the common information obtainer 430.

Figure 5:
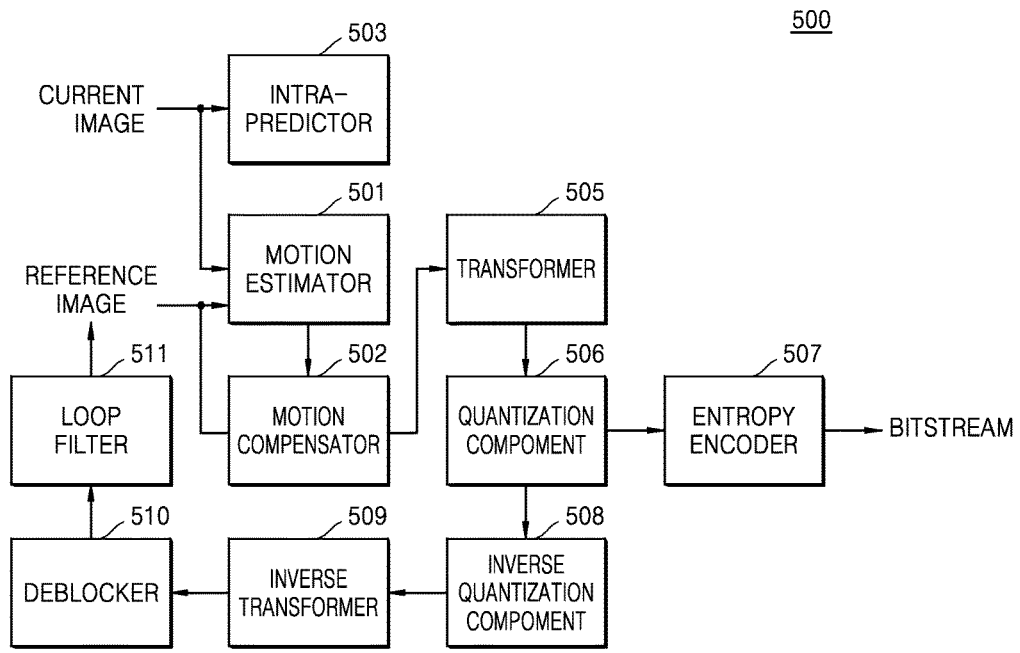
FIG. 5 is a block diagram illustrating an internal structure of an image encoder according to an exemplary embodiment.

FIG. 5 is a block diagram illustrating an internal structure of an image encoder according to an exemplary embodiment.

Referring to FIG. 5, the image encoder 500 according to an exemplary embodiment may include a motion estimator 501, a motion compensator 502, an intra-predictor 503, a transformer 505, a quantization component 506, an entropy encoder 507, an inverse quantization component 508, an inverse transformer 509, a deblocker 510, and a loop filter 511, which may be embodied as hardware, software, or a combination thereof. The image encoder 500 of FIG. 5 may correspond or be analogous to the image encoder 230 of FIG. 2.

The motion estimator 501 may estimate the motion of a current image, which is currently input from the outside, by using reference images belonging to an RPS for the current image among images constituting video.

The motion compensator 502 may produce a predicted image of the current image from the reference images belonging to the RPS for the current image. More specifically, the motion compensator 502 may produce a predicted image of the current image, based on the motion of the current image estimated by the motion estimator 501.

The intra-predictor 503 may produce a predicted image of the current image by predicting blocks corresponding to an intra mode among blocks that constitute the current image.

The transformer 505 may transform a residual image, which is obtained by subtracting a predicted image from the current image, from a spatial domain to a frequency domain. For example, the transformer 505 may transform the residual image from the spatial domain to the frequency domain by performing integer transformation such as Discrete Hadamard Transform (DHT), Discrete Cosine Transform (DCT), etc.

The quantization component 506 may quantize results of transformation performed by the transformer 505.

The entropy encoder 507 may generate a bitstream by entropy-encoding results of quantization performed by the quantization component 506. In particular, the entropy encoder 507 may entropy-encode not only the results of quantization performed by the quantization component 506 but also information for decoding video, e.g., RPS information used to perform inter prediction, motion vector information, location information of neighboring blocks used to perform intra prediction, etc.

The inverse quantization component 508 may inversely quantize the results of quantization performed by the quantization component 506.

The inverse transformer 509 may restore a residual image between the current image and a predicted image by transforming results of inverse quantization performed by the inverse quantization component 508, i.e., transform coefficients, from a frequency domain to a spatial domain.

The deblocker 510 and the loop filter 511 may perform adaptive filtering on an image restored by the inverse quantization component 508.

Figure 6:
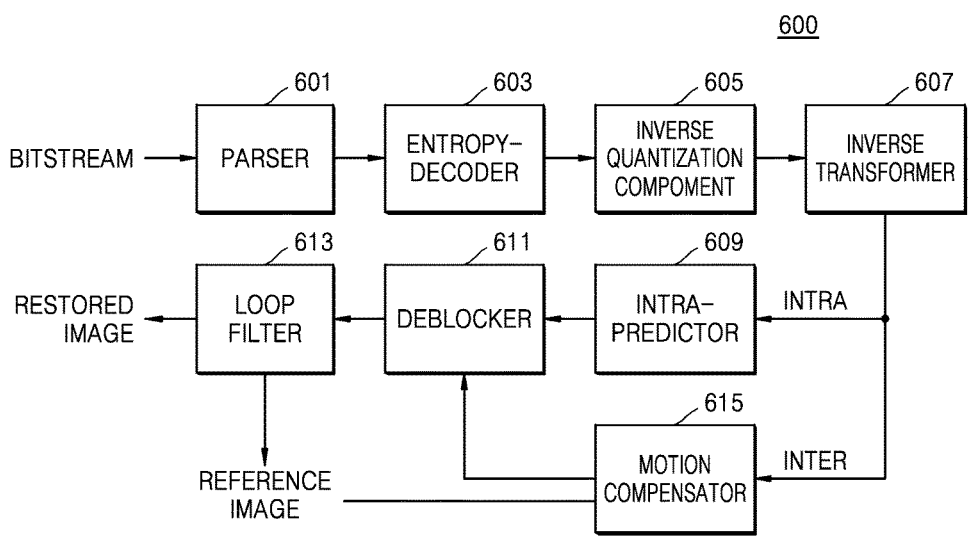
FIG. 6 is a block diagram illustrating an internal structure of an image decoder according to an exemplary embodiment.

FIG. 6 is a block diagram illustrating an internal structure of an image decoder according to an exemplary embodiment.

Referring to FIG. 6, the image decoder 600 according to an exemplary embodiment may include a parser 601, an entropy-decoder 603, an inverse quantization component 605, an inverse transformer 607, an intra-predictor 609, a deblocker 611, a loop filter 613, and a motion compensator 615, which may be embodied as hardware, software, or a combination thereof. The image decoder 600 of FIG. 6 may correspond or be analogous to the image decoder 320 of FIG. 3 and the image decoder 440 of FIG. 4.

The parser 601 may parse a bitstream to extract encoded image data to be decoded and coding information for decoding the encoded image data from the bitstream.

The entropy decoder 603 may entropy-decode the bitstream to restore information for decoding video.

The inverse quantization component 605 may inversely quantize values restored by the entropy decoder 603 to restore transform coefficients.

The inverse transformer 607 may transform the transform coefficients restored by the inverse quantization component 602 from a frequency domain to a spatial domain to restore a residual image between a current image and a predicted image.

The intra-predictor 609 may produce a predicted image of the current image by predicting the values of blocks of the current image from the values of restored blocks adjacent to the blocks of the current image among blocks of the current image that are restored for blocks corresponding to an intra-mode among blocks that constitute the current image.

A restored image may be produced by adding a residual image to the predicted image.

The motion compensator 615 may produce a predicted image of the current image from reference images included in an RPS to be used to prediction-decode the current image. A restored image may be produced by adding a residual image to the predicted image.

The deblocker 611 and the loop filter 613 may adaptively filter a restored image.

Methods of encoding or decoding an image, according to exemplary embodiments, will be described in more detail with reference to FIGS. 7 to 10 below.

Figure 7:
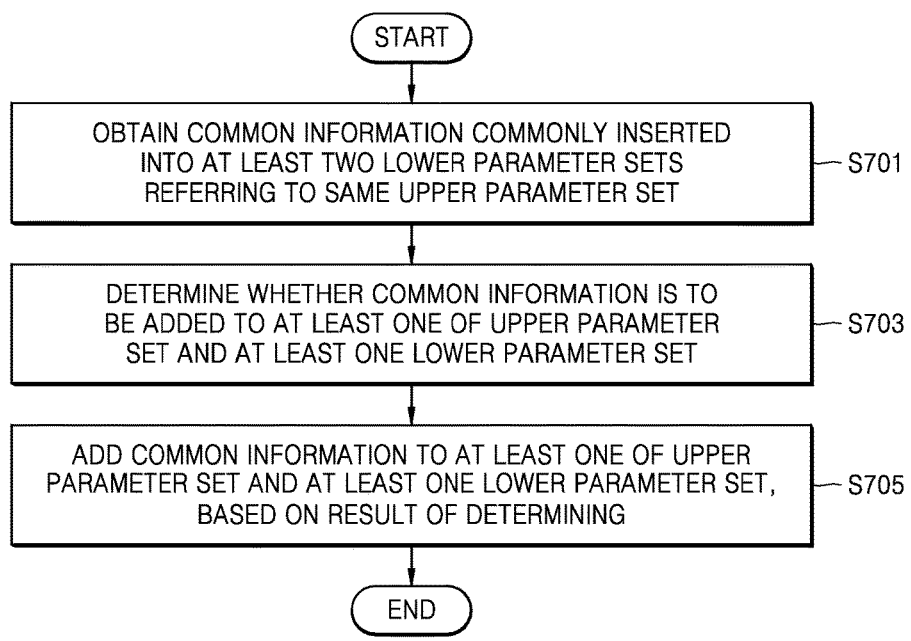
FIGS. 7 and 8 are flowcharts illustrating methods of generating a parameter set according to exemplary embodiments.
Figure 8:
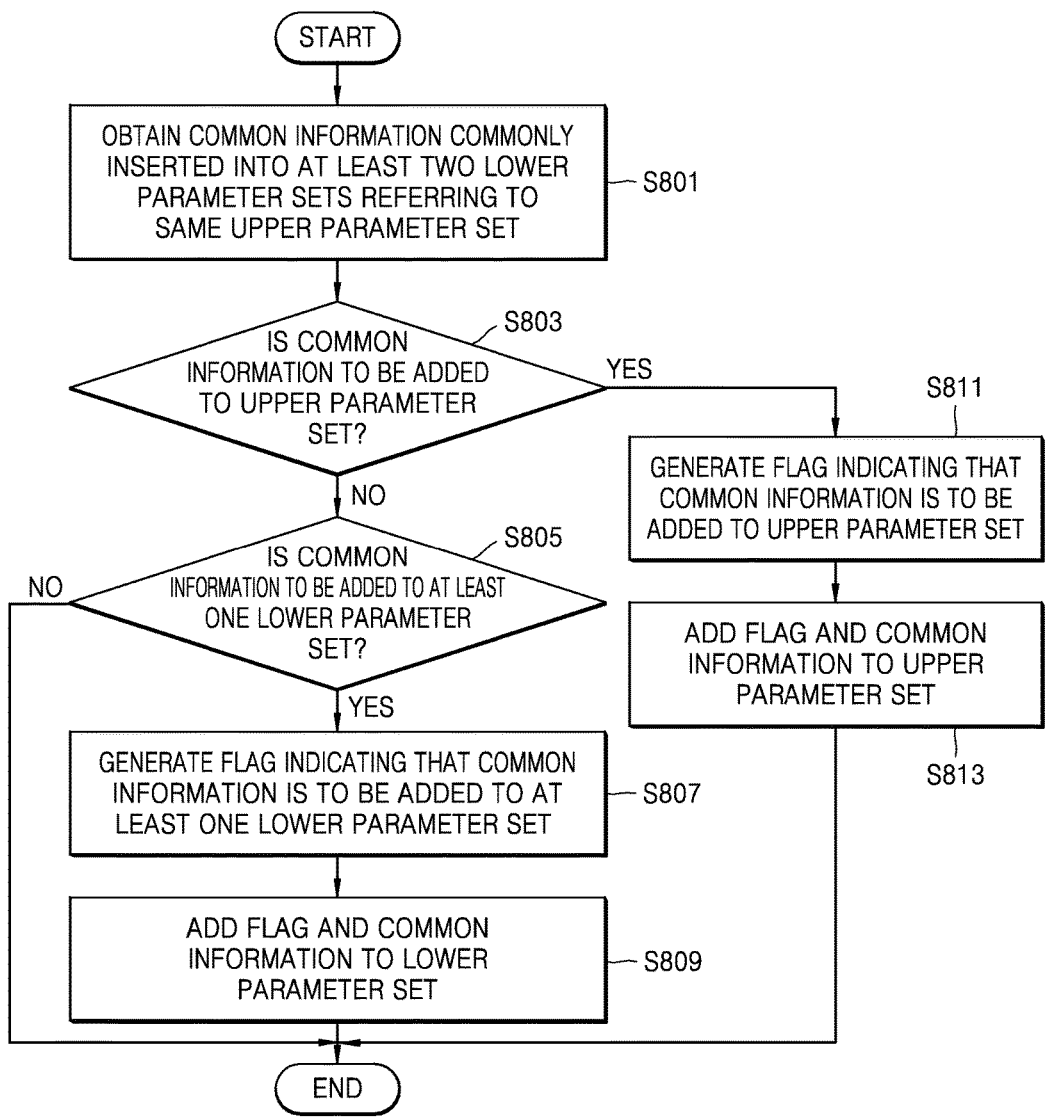

FIGS. 7 and 8 are flowcharts illustrating methods of generating a parameter set according to exemplary embodiments.

Referring to FIG. 7, in operation S701, the parameter set generation apparatus 100 may obtain common information commonly inserted into at least two lower parameter sets referring to the same upper parameter set. In an exemplary embodiment, the parameter set generation apparatus 100 may encode common information commonly inserted into two or more lower parameter sets by adding the common information to the upper parameter set so that the common information may be signaled only once.

In operation S703, the parameter set generation apparatus 100 may determine whether the common information obtained in operation S701 is to be added to at least one of the upper parameter set and at least one lower parameter set. Specifically, the parameter set generation apparatus 100 may determine whether the common information is to be redundantly added to two or more lower parameter sets or is to be added to the upper parameter set or a lower parameter set so that the common information may be signaled only once without adding the common information to other parameter sets.

A lower parameter set to which the common information is to be added may be, for example, an SPS for image data of a base layer. Thus, the parameter set generation apparatus 100 may add the common information obtained in operation S701 to the SPS for the image data of the base layer and add reference information to an SPS for image data of another layer so that the SPS may refer to the SPS of the base layer.

In operation S705, the parameter set generation apparatus 100 may add the common information to at least one of the upper parameter set and the at least one lower parameter set, based on a result of the determining in operation S703. Thus, a lower parameter set, including the common information, may obtain the common information by referring to the upper parameter set or the at least one lower parameter set during a decoding process. Accordingly, the common information may be encoded not to be redundantly signaled in the two or more lower parameter sets.

Referring to FIG. 8, the image encoding apparatus 200 may determine whether common information is to be added to an upper parameter set or at least one lower parameter set, based on a flag, unlike in the method of FIG. 7.

Referring to FIG. 8, in operation S801, the image encoding apparatus 200 may obtain common information commonly inserted into at least two lower parameter sets referring to the same upper parameter set.

In operation S803, the image encoding apparatus 200 may determine whether the common information is to be added to the upper parameter set of at least two lower parameter sets to which the common information obtained in operation S801 is to be inserted.

However, when the common information includes at least one among image format information, bit depth information, resolution information, and 3D coding information of image data to be encoded, the image encoding apparatus 200 may add the common information to the upper parameter set. Before a lower parameter set or the image data is received or parsed, the session negotiation or contents selection may be performed by adding information for session negotiation or contents selection to the upper parameter set.

In operation S805, when it is determined in operation S803 that the common information is not to be added to the upper parameter set, the image encoding apparatus 200 may determine whether the common information obtained in operation S801 is to be added to at least one lower parameter set.

In operation S807, when the common information obtained in operation S801 is added to at least one lower parameter set, the image encoding apparatus 200 may generate a flag indicating this fact. That is, the image encoding apparatus 200 may generate a flag indicating that the common information is not added to the upper parameter set but is added to at least one lower parameter set. When the common information is added to the at least one lower parameter set, a lower parameter set that does not contain the common information may obtain the common information by referring to the at least one lower parameter set containing the common information during a decoding process. To this end, in an exemplary embodiment, the image encoding apparatus 200 may add information for referring to the at least one lower parameter set containing the common information to the lower parameter set. Furthermore, the image encoding apparatus 200 may generate a flag indicating that the common information is not added to the upper parameter set.

When the common information is added to at least one lower parameter set instead of the upper parameter set, the data size of the upper parameter set may be prevented from increasing due to the addition of the common information, and the common information may be prevented from being redundantly encoded several times. When the data size of the upper parameter set increases, performing of the session negotiation or contents selection may be delayed, thus lowering an encoding/decoding efficiency. Thus, the image encoding apparatus 200 may add the common information to the at least one lower parameter set instead of the upper parameter set, in consideration of a delay in the session negotiation or contents selection caused when the data size of the upper parameter set increases.

In operation S809, the image encoding apparatus 200 may add the flag generated in operation S807 and the common information to the at least one lower parameter set determined in operation S805. Furthermore, the flag generated in operation S807 may be added to the upper parameter set, considering that the upper parameter set is to be processed earlier than lower parameter sets. The flag that may be added to the upper parameter set may include at least one of a flag indicating whether the common information is to be added to the upper parameter set and a flag indicating whether the common information is to be added to the at least one lower parameter set. Furthermore, the image encoding apparatus 200 may generate a parameter set and encode an image based on the parameter set.

In operation S811, when in operation S803, the image encoding apparatus 200 determines that the common information is to be added to the upper parameter set, the image encoding apparatus 200 may generate a flag indicating that the common information is to be added to the upper parameter set. In addition, the image encoding apparatus 200 may generate a flag indicating whether the common information is to be added to a lower parameter set. The image encoding apparatus 200 may add reference information to the lower parameter set so as to obtain the common information of the lower parameter set by referring to the upper parameter set.

When the common information is added to the upper parameter set, the image encoding apparatus 200 may not add the common information to a lower parameter set, but exemplary embodiment is not limited thereto and the image encoding apparatus 200 may add the common information to the lower parameter set.

In operation S813, the image encoding apparatus 200 may add the flag generated in operation S811 and the common information to the upper parameter set. In addition, the image encoding apparatus 200 may generate a parameter set and encode an image based on the parameter set.

Furthermore, when it is determined in operation S805 that the common information is not to be added to the at least one lower parameter set, the image encoding apparatus 200 may redundantly add the common information to the two or more parameter sets to which the common information is inserted in operation S801.

Figure 9:
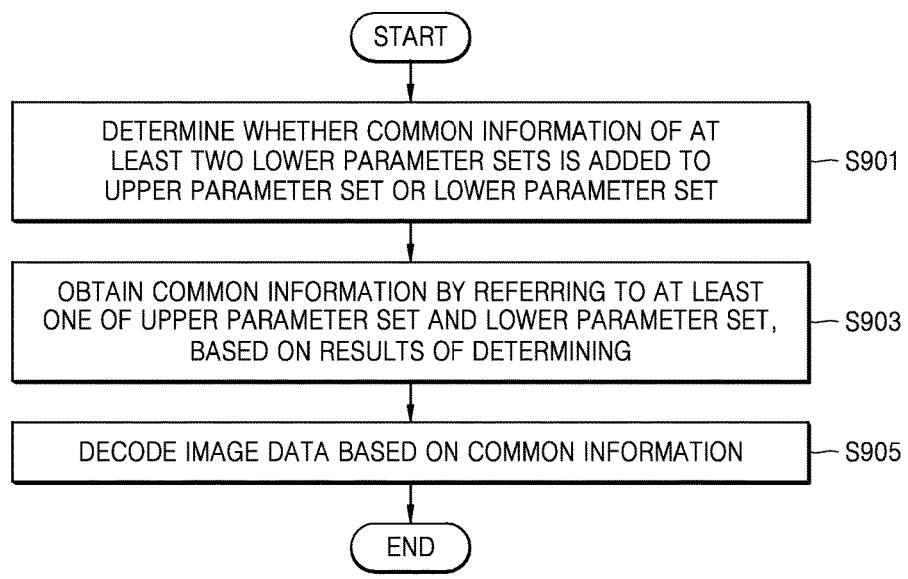
FIGS. 9 and 10 are flowcharts illustrating methods of decoding an image according to exemplary embodiments.
Figure 10:
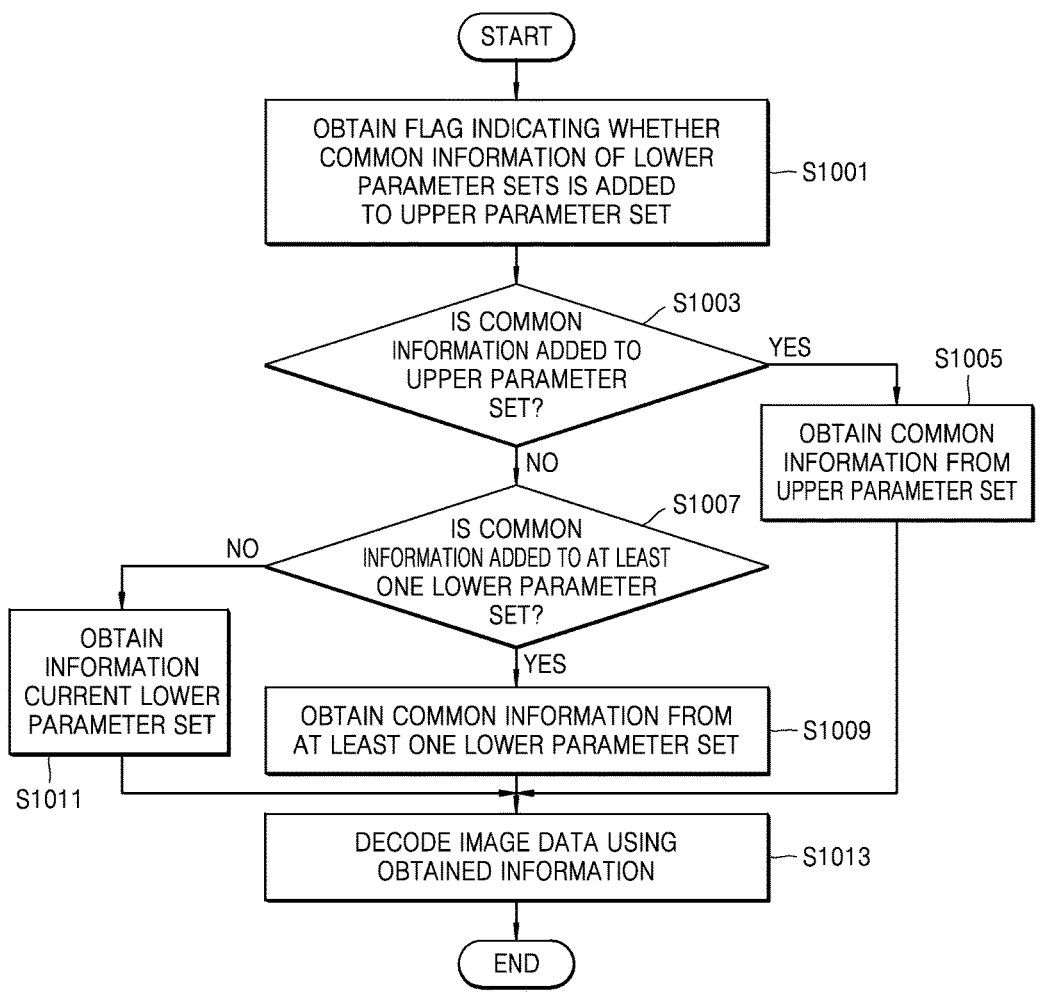

FIGS. 9 and 10 are flowcharts illustrating methods of decoding an image, according to exemplary embodiments.

Referring to FIG. 9, in operation S901, the image decoding apparatus 300 may determine whether common information of at least two lower parameter sets referring to the same upper parameter set is added to the upper parameter set or a lower parameter set.

In operation S903, the image decoding apparatus 300 may obtain the common information of a lower parameter set by referring to at least one of the upper parameter set and the lower parameter set, based on the results of determined performed in operation S901.

In operation S905, the image decoding apparatus 300 may decode image data corresponding to the lower parameter set obtaining the common information from another parameter set by using the common information obtained in operation S903.

In addition, when the common information includes at least one among image format information, bit depth information, resolution information, and 3D coding information of encoded image data and is added to an upper parameter set, the image decoding apparatus 300 may perform session negotiation or contents selection based on the information described above.

Referring to FIG. 10, in operation S1001, the image decoding apparatus 400 may determine whether common information of at least two lower parameter sets referring to the same upper parameter set is added to an upper parameter set or a lower parameter set.

In operation S1003, the image decoding apparatus 400 may determine whether the common information is added to the upper parameter set. The image decoding apparatus 400 may determine whether the common information is added to the upper parameter set, based on a flag added to the upper parameter set.

In operation S1005, the image decoding apparatus 400 may obtain the common information of the two or more lower parameter sets from the upper parameter set, based on the determination performed in operation S1003. In operation S1013, the image decoding apparatus 400 may decode an image based on the common information.

In operation S1007, the image decoding apparatus 400 may determine whether the common information is added to at least one lower parameter set. The image decoding apparatus 400 may determine whether the common information is added to at least one lower parameter set, based on a flag added to the upper parameter set or a lower parameter set.

In operation S1009, the image decoding apparatus 400 may obtain the common information of the at least two lower parameter sets from at least one lower parameter set i.e., first lower parameter set according to the determination performed in operation S1007.

In addition, in operation S1011, when it is determined in operation S1007 that the common information is not added to at least one lower parameter set, the common information may not be present for at least two lower parameter sets or may be redundantly added to at least two lower parameter sets. Thus, when information needed to decode the image is obtained from each of lower parameter sets, the image decoding apparatus 400 may not refer to the upper parameter set or at least one lower parameter set so as to obtain the common information. The image decoding apparatus 400 may obtain the information needed to decode the image from current lower parameter set.

In operation S1013, the image decoding apparatus 400 may decode image data for a desired lower parameter set by using the information obtained in operations S1005, S1009, and S1011.

Figure 11:
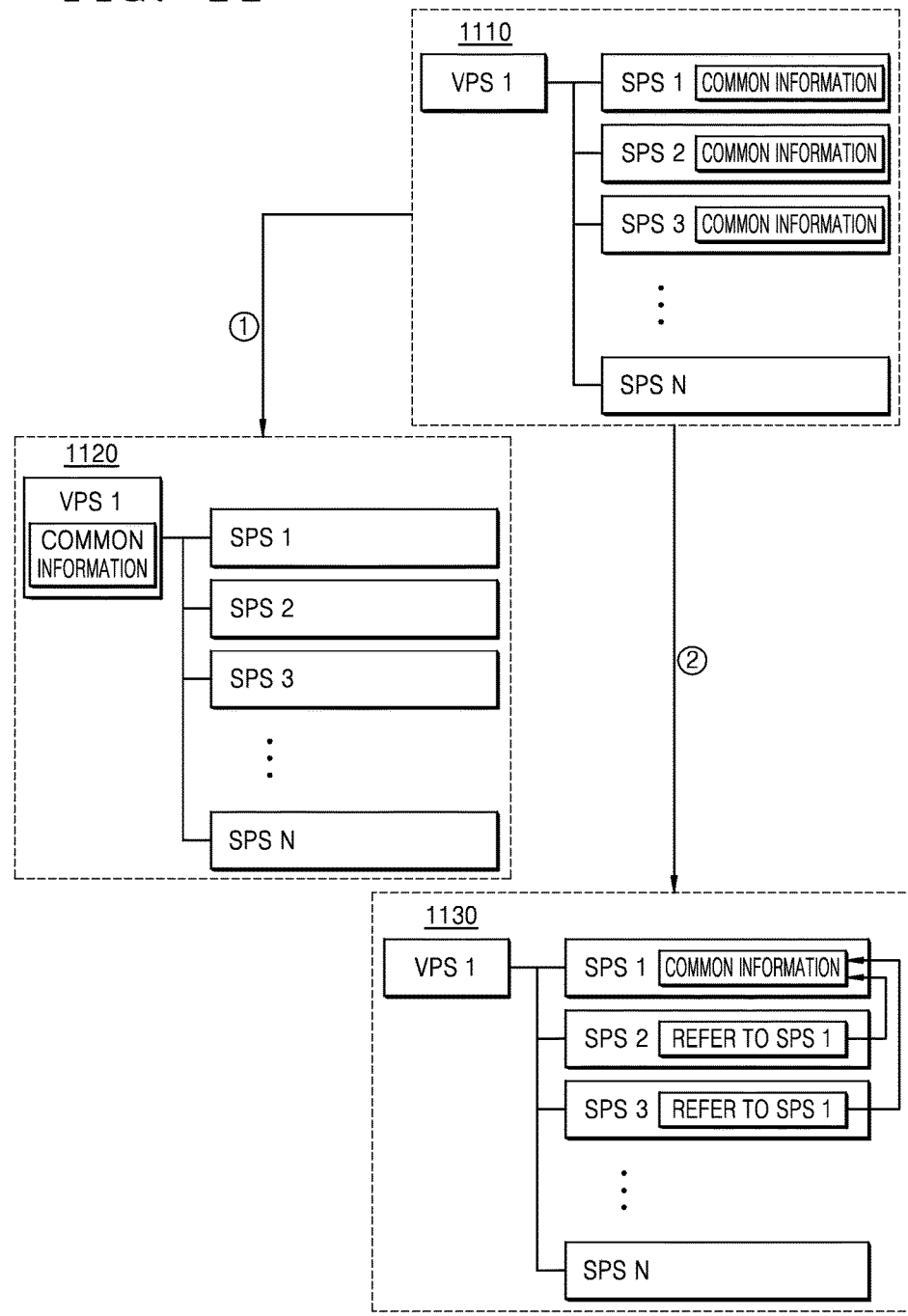
FIG. 11 is a diagram illustrating a method of generating a parameter set according to an exemplary embodiment.

FIG. 11 is a diagram illustrating a method of generating a parameter set, according to an exemplary embodiment.

In FIG. 11, referring to a diagram 1110, a VPS 1, and an SPS 1 to an SPS N referring to the VPS 1 may be present, according to an exemplary embodiment. In this case, according to an exemplary embodiment, when there is information commonly included in the SPS 1, the SPS 2, and the SPS 3, each of these parameter sets may be reconfigured from the diagram 1110 to a diagram 1120 or a diagram 1130.

Referring to the diagram 1120, common information included in the SPS 1, the SPS 2, and the SPS 3 is also included in the VPS 1. Thus, the common information included in the VPS 1 may be encoded once without redundantly encoding the common information included in at least two SPSs among the SPS1 to the SPS3, thereby improving the efficiency of encoding the common information. The common information of the SPS 1, the SPS 2, and the SPS 3 may be obtained by referring to the VPS 1 during a decoding process.

Referring to the diagram 1130, common information included in the SPS 2 and the SPS 3 is also included in the SPS 1. Thus, the common information included in the SPS 1 may be encoded once without redundantly encoding the common information included in at least two SPSs, thereby improving the efficiency of encoding the common information. In addition, referring to the diagram 1130, although the common information is added, the data size of the VPS 1 does not increase, unlike in the diagram 1120. The SPS 2 and the SPS 3 may obtain the common information by referring to the SPS 1 during a decoding process.

FIGS. 12 to 14 are diagrams illustrating examples of parameters sets including syntax elements, according to exemplary embodiments.

FIG. 12 illustrates a VPS as an example of an upper parameter set according to an exemplary embodiment.

Referring to FIG. 12, a vps_extension 1210 may include a vps_sps_common_syntax_present_flag 1220 and a vps_sps_interlayer_prediction_enable_flag 1230 that indicate whether common information is included in an upper parameter set or a lower parameter set.

The vps_sps_common_syntax_present_flag 1220 is a flag indicating whether common information of lower parameter sets is included in the upper parameter set. For example, the vps_sps_common_syntax_present_flag 1220 may have a value of '1' when the common information is included in the upper parameter set, and may have a value of '0' when the common information is not included in the upper parameter set.

The vps_sps_interlayer_prediction_enable_flag 1230 is a flag indicating whether common information of lower parameter sets is included in one lower parameter set. In this case, the lower parameter set including the common information may be a lower parameter set corresponding to image data of a base layer. For example, the vps_sps_interlayer_prediction_enable_flag 1230 may have a value of '1' when the common information is included in the lower parameter set, and may have a value of '0' when the common information is not included in the lower parameter set.

An interlayer_sps_prediction_flag[i] 1232 is a flag indicating that common information of an SPS corresponding to image data of an $i^{th}$ layer may be obtained by referring to an SPS containing the common information. For example, the common information of the SPS corresponding to the image data of the $i^{th}$ layer may be obtained by referring to an SPS containing the common information when the interlayer_sps_prediction_flag[i] 1232 has a value of '1'. Information for each of SPSs may be independent information that does not need to refer to other SPSs of different layers when the interlayer_sps_prediction_flag[i] 1232 has a value of '0'.

An sps_prediction_ref_layer_id[i] 1234 is a syntax indicating an SPS of a layer that includes the common information of the SPS corresponding to the image data of the $i^{th}$ layer.

When an if(!vps_sps_common_syntax_present_flag) 1221 indicates the common information is not included in the upper parameter set, whether the common information is included in a lower parameter set may be determined based on the vps_sps_interlayer_prediction_enable_flag 1230.

An if(vps_sps_interlayer_prediction_enable_flag) 1231 may indicate whether common information of each of the SPSs is to be obtained by referring to another SPS based on the vps_sps_interlayer_prediction_enable_flag 1230 and indicate an SPS containing the common information for each of the SPSs, in the syntaxes 1232 to 1234.

An if(vps_sps_common_syntax_present_flag) 1240 may indicate common information that each of the SPSs may obtain by referring to another SPS based on the vps_sps_common_syntax_present_flag 1220, in syntaxes 1241 to 1243.

FIG. 13 illustrates a SPS as an example of a lower parameter set according to an exemplary embodiment.

A seq_parameter_set_rbsp 1310 may include an if (!vps_sps_common_syntax_present_flag||layer_id==0||interlayer_sps_prediction_flag[i]==0) 1320, and various types of information 1330 for encoding/decoding an image.

When the if(!vps_sps_common_syntax_present_flag||layer_id==0||interlayer_sps_prediction_flag[i]==0) 1320 indicates that common information is not included in the VPS or a current SPS is either an SPS corresponding to image data of a base layer which is a layer 0 or an SPS that is an independent SPS that is not referred to by an SPS corresponding to image data of an $i^{th}$ layer, the various types of information 1330 included in an if-clause may be included in the current SPS and encoded. The various types of information 1330 included in the if-clause may be common information obtained by referring to another SPS.

FIG. 14 illustrates a VPS as an example of an upper parameter set according to another exemplary embodiment.

Syntaxes 1420 may include various types of information that may be used for the image decoding apparatus 300 to perform session negotiation or contents selection.

Specifically, vps_chroma_format_idc may correspond to the image format information described above and have a value of '0', '1', '2', or '3'.

vps_pic_width_in_luma_samples and vps_pic_height_in_luma_samples may correspond to the resolution information described above and have an integer value. vps_pic_width_in_luma_samples may indicate the number of pixels of a decoded image in a horizontal direction. vps_pic_height_in_luma_samples may indicate the number of pixels of the decoded image in a vertical direction.

vps_bit_depth_luma_minus8 and vps_bit_depth_chroma_minus8 may correspond to the bit depth information described above. vps_bit_depth_luma_minus8 and vps_bit_depth_chroma_minus8 may indicate bit depth information of a luma sample and bit depth information of a chroma sample, respectively, and have a value of '0', '1', '2', '3', '4', '5', or '6'.

vps_frame_packed_flag may correspond to the above-described frame packing information indicating whether a current image is frame-packed. vps_interlaced_flag may correspond to the above-described interlace information indicating whether the current image has an interlaced video format. vps_frame_packed_flag and vps_interlaced_flag may have a value of '0' or '1'. vps_interlaced_flag is based on a premise that the current image is frame-packed and may thus have a value of '1' when the vps_frame_packed_flag has a value of '1'. That is, vps_interlaced_flag always has a value of '0' when the vps_frame_packed_flag has a value of '0', and may have a value of '0' or '1' when the vps_frame_packed_flag has a value of '1'.

The various types of information described above may be included in an upper parameter set that may be processed earlier than a lower parameter set and may be thus used to perform session negotiation or contents selection during an image decoding process.

According to an exemplary embodiment, an image may be efficiently encoded or decoded by removing information that is redundantly included in parameter sets.

According to an exemplary embodiment, information included in a lower parameter set and is needed to perform session negotiation may be included in an upper parameter set so that session negotiation may be performed when the upper parameter set is processed.

A method according to an exemplary embodiment can be embodied as computer readable code in computer readable recoding media (including various devices having an information processing function). The computer readable recording media include various types of recording apparatuses capable of storing data that is read by a computer system, e.g., read-only memory (ROM), random access memory (RAM), a compact disc (CD)-ROM, a magnetic tape, a floppy disk, an optical data storage device, and so on.

Although novel characteristics that are applicable to various exemplary embodiments have been focused in the present disclosure, it would be obvious to those of ordinary skill in the art that the above exemplary embodiments are to cover all modifications, equivalents, and alternatives falling within the scope of inventive concept. Accordingly, it will be understood that various changes in form and details may be made therein without departing from the spirit and scope of the following claims and their equivalents.

What is claimed is:

1. A method of generating a parameter set, the method comprising:
    obtaining common information inserted into at least two lower parameter sets that refer to the same upper parameter set;
    determining whether the common information is to be added to at least one among the upper parameter set and the at least two lower parameter sets;
    generating a first flag indicating that the common information is to be added to the upper parameter set or a second flag indicating that the common information is to be added to at least one among the at least two lower parameter sets, based on a result of the determining;
    adding the generated first or second flag to the upper parameter set; and
    adding the common information to at least one among the upper parameter set and the at least two lower parameter sets based on the added first or second flag.

2. The method of claim 1, wherein the adding the common information to at least one among the upper parameter set and the at least two lower parameter sets comprises adding, to at least one lower parameter set, information which references the common information included in at least one among the upper parameter set and the at least two lower parameter sets, based on the result of the determining.

3. The method of claim 1, wherein:
    the common information comprises at least one among image format information, bit depth information, resolution information, and three-dimensional (3D) coding information of image data to be encoded,
    the upper parameter set is a video parameter set (VPS),
    the at least two lower parameter sets are sequence parameter sets (SPSs), and
    the SPSs are parameter sets which refer to the VPS.

4. A method of decoding an image, the method comprising:
    obtaining at least one among a first flag indicating whether common information of a lower parameter set is added to an upper parameter set and a second flag indicating whether the common information is added to at least one lower parameter set among lower parameter sets;
    determining whether common information is added to at least one among the upper parameter set and the at least one lower parameter set, based on the at least one of the first flag and the second flag;
    obtaining the common information of the lower parameter set by referring to at least one among the upper parameter set and the at least one lower parameter set, based on a result of the determining; and
    decoding an image corresponding to the at least one lower parameter set based on the obtained common information.

5. The method of claim 4, wherein:
    the common information comprises at least one among image format information; bit depth information; resolution information; and three-dimensional (3D) coding information of image data to be encoded,
    the upper parameter set is a video parameter set (VPS),
    the at least one lower parameter set is a sequence parameter set (SPS), and
    the SPS is a parameter set which refers to the VPS.

6. The method of claim 5, wherein the decoding the image corresponding to the at least one lower parameter set comprises:
    performing session negotiation or selecting data to be decoded, based on at least one among the image format information, the bit depth information, the resolution information, and the 3D coding information of the image data to be encoded; and
    decoding the image based on a result of the performing session negotiation or the selecting data to be decoded.

7. A parameter set generation apparatus comprising:
- a common information obtainer configured to obtain common information inserted into at least two lower parameter sets which refer to the same upper parameter set; and
- a parameter set generator configured to determine whether the common information is to be added to at least one among the upper parameter set and the at least two lower parameter sets, generate a first flag indicating that the common information is to be added to the upper parameter set or a second flag indicating that the common information is to be added to at least one among the at least two lower parameter sets, based on a result of the determining, and configured to add the common information to at least one among the upper parameter set and the at least two lower parameter sets, based on the added first or second flag.

8. The parameter set generation apparatus of claim 7, wherein the parameter set generator adds, to the at least one lower parameter set, information which references the added common information, based on the result of the determining.

9. The parameter set generation apparatus of claim 7, wherein:
- the common information comprises at least one among image format information, bit depth information; resolution information, and three-dimensional (3D) coding information of image data to be encoded,
- the upper parameter set is a video parameter set (VPS),
- the lower parameter sets are sequence parameter sets (SPSs), and
- the SPSs are parameter sets which refers to the VPS.

10. An image decoding apparatus comprising:
- a flag obtainer configured to obtain at least one among a first flag indicating that common information of a lower parameter set is added to an upper parameter set and a second flag indicating that the common information is added to at least one lower parameter set,
- a common information obtainer configured to determine whether the common information of the lower parameter set is added to at least one among the upper parameter set and the at least one lower parameter set based on the at least one of the first flag and the second flag, and configured to obtain the common information of the lower parameter set by referring to at least one among the upper parameter set and the at least one lower parameter set, based on a result of the determining; and
- an image decoder configured to decode an image corresponding to the at least one lower parameter set based on the obtained common information.

11. The image decoding apparatus of claim 10, wherein:
- the common information comprises at least one among image format information, bit depth information, resolution information, and three-dimensional (3D) coding information of image data to be encoded,
- the upper parameter set is a video parameter set (VPS),
- the at least one lower parameter set is a sequence parameter set (SPS), and
- wherein the SPS is a parameter set which refers to the VPS.

12. The image decoding apparatus of claim 10, wherein the image decoder is configured to perform session negotiation or select data to be decoded, based on at least one among image format information, bit depth information, resolution information, and the 3D coding information of the image data to be encoded, and configured to decode the image based on a result of the performing session negotiation or the selecting data to be decoded.

13. The method of claim 1, wherein the at least two lower parameter sets and the upper parameter set corresponds to header information of a network abstraction layer of image data encoded with a high efficiency video coding standard.

14. The method of claim 1, further comprising adding, to the upper parameter set, the first flag which indicates whether the common information of the at least two lower parameter sets is included in the upper parameter set and the second flag which indicates that the common information of the at least two lower parameter sets is included in one of the two lower parameter sets.

15. The method of claim 1, wherein the common information comprises at least one of image format information, bit depth information, resolution information, a three-dimensional coding information and wherein the determining comprises determining to which one parameter set to add the common information from among the upper parameter set and the at least two lower parameter sets.

16. The method of claim 1, wherein the common information is added to one of the upper parameter set and one of the at least two lower parameter sets and wherein the common information comprises information related to at least one of a session negotiation and a selection of contents during decoding of the contents.

* * * * *